(12) United States Patent
Ishida et al.

(10) Patent No.: US 10,870,178 B2
(45) Date of Patent: Dec. 22, 2020

(54) FLUX-CORED WIRE FOR ARC WELDING OF DUPLEX STAINLESS STEEL AND WELD METAL

(71) Applicant: Kobe Steel, Ltd., Kobe (JP)

(72) Inventors: Masatoshi Ishida, Fujisawa (JP); Hiroshi Sugahara, Fujisawa (JP); Tetsunao Ikeda, Fujisawa (JP); Shigeki Nishiyama, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 732 days.

(21) Appl. No.: 15/398,357

(22) Filed: Jan. 4, 2017

(65) Prior Publication Data

US 2017/0239758 A1    Aug. 24, 2017

(30) Foreign Application Priority Data

Feb. 22, 2016   (JP) .................................. 2016-031481

(51) Int. Cl.
*B23K 35/02* (2006.01)
*B23K 35/36* (2006.01)
(Continued)

(52) U.S. Cl.
CPC ............ *B23K 35/0266* (2013.01); *B23K 9/00* (2013.01); *B23K 35/308* (2013.01); *B23K 35/3086* (2013.01); *B23K 35/362* (2013.01); *B23K 35/3602* (2013.01); *B23K 35/3605* (2013.01); *B23K 35/3607* (2013.01);
(Continued)

(58) Field of Classification Search
CPC .... B23K 9/00; B23K 35/0266; B23K 35/308; B23K 35/3086; B23K 35/3602; B23K 35/3605; B23K 35/3607; B23K 35/3608; B23K 35/362; B23K 35/368; C22C 38/40; C22C 38/44; C22C 38/50; C22C 38/58;
(Continued)

(56) References Cited

U.S. PATENT DOCUMENTS 6,340,396 B1    1/2002  Ogawa et al.
2003/0196997 A1* 10/2003  Watanabe .......... B23K 35/3608
                                              219/145.22
(Continued)

FOREIGN PATENT DOCUMENTS

CN    102046325 A    5/2011
CN    102091881 A    6/2011
(Continued)

*Primary Examiner* — Dana Ross
*Assistant Examiner* — Ket D Dang
(74) *Attorney, Agent, or Firm* — Oblon, McClelland, Maier & Neustadt, L.L.P.

(57) ABSTRACT

A flux-cored wire for arc welding of a duplex stainless steel includes a stainless-steel sheath filled with a flux and contains, with respect to the total mass of the wire, predetermined amounts of Cr, Ni, Mo, N, Mn, and Si, in which letting a Ti alloy content in terms of Ti be [Ti] and letting an Al alloy content in terms of Al be [Al], [Ti] and [Al] are predetermined values, and in which parameter A expressed as A=[Ti]+2×[Al] satisfies a predetermined value, and the balance is composed of Fe, a slag-forming component, and incidental impurities.

19 Claims, 1 Drawing Sheet

(51) Int. Cl.
- *B23K 35/362* (2006.01)
- *B23K 35/368* (2006.01)
- *B23K 35/30* (2006.01)
- *C22C 38/50* (2006.01)
- *C22C 38/58* (2006.01)
- *C22C 38/44* (2006.01)
- *C22C 38/02* (2006.01)
- *C22C 38/06* (2006.01)
- *C22C 38/42* (2006.01)
- *C22C 38/00* (2006.01)
- *C22C 38/04* (2006.01)
- *B23K 9/00* (2006.01)

(52) U.S. Cl.
CPC ........ *B23K 35/3608* (2013.01); *B23K 35/368* (2013.01); *C22C 38/001* (2013.01); *C22C 38/02* (2013.01); *C22C 38/04* (2013.01); *C22C 38/06* (2013.01); *C22C 38/42* (2013.01); *C22C 38/44* (2013.01); *C22C 38/50* (2013.01); *C22C 38/58* (2013.01)

(58) Field of Classification Search
CPC ....... C22C 38/001; C22C 38/02; C22C 38/04; C22C 38/06; C22C 38/42
USPC ............... 219/145.22, 145.1, 146.23, 146.31
See application file for complete search history.

(56) References Cited

U.S. PATENT DOCUMENTS

| | | | | |
|---|---|---|---|---|
| 2008/0173701 | A1* | 7/2008 | Frankel | B23K 35/0261 228/262.3 |
| 2009/0158889 | A1* | 6/2009 | Kodama | B23K 35/3086 75/302 |
| 2009/0314760 | A1* | 12/2009 | Mizumoto | B23K 35/304 219/145.22 |
| 2011/0062133 | A1* | 3/2011 | Inoue | B23K 35/3053 219/145.22 |
| 2011/0139761 | A1* | 6/2011 | Sugahara | B23K 35/0266 219/145.22 |
| 2011/0253691 | A1* | 10/2011 | Kodama | B23K 9/23 219/137 R |
| 2015/0114944 | A1* | 4/2015 | Fukuda | B23K 35/3607 219/145.22 |

FOREIGN PATENT DOCUMENTS

| | | | | |
|---|---|---|---|---|
| EP | 1547722 | A1 * | 6/2005 | ......... B23K 35/3053 |
| EP | 2341159 | A1 * | 7/2011 | ......... B23K 35/0266 |
| JP | 2000-176681 | | 6/2000 | |
| JP | 4531118 | | 8/2010 | |
| JP | 2011-125875 | | 6/2011 | |
| KR | 10-2011-0004452 | A | 1/2011 | |
| KR | 10-2011-0068895 | A | 6/2011 | |

* cited by examiner

FLUX-CORED WIRE FOR ARC WELDING OF DUPLEX STAINLESS STEEL AND WELD METAL

BACKGROUND OF THE INVENTION

1. Field of the Invention

The present invention relates to a flux-cored wire used for arc welding of a duplex stainless steel and a weld metal produced by welding with the wire.

2. Description of the Related Art

Duplex stainless steels each containing an austenite phase and a ferrite phase in a ratio of about 1:1 have been widely used in a variety of fields, such as chemical plant equipment, oil country tubular goods for drilling for oil or natural gas, and seawater desalination plants, because of their particularly good strength properties, pitting corrosion resistance, and stress corrosion cracking resistance. Duplex stainless steels used for offshore structures are required to have pitting corrosion resistance in seawater environments. Thus, a duplex stainless steel of a grade equivalent to UNS S31803 or UNS S32750 is often used. Offshore structures are often used in a low-temperature environment. Weld zones of duplex stainless steels used for offshore structures are required to have higher low-temperature toughness than that of weld zones of duplex stainless steels used for common structures from the viewpoint of eliminating the need for maintenance. For example, weld zones of duplex stainless steels used for offshore structures tend to be required to have high impact absorption energy at about −40° C. or about −50° C.

Despite this demand by the offshore structure market, in metal active gas arc welding (MAG welding) of duplex stainless steels with flux-cored wires in the related art, large amounts of slag components or nonmetallic inclusions originating from deoxidizing components are inevitably introduced into weld metals in molten states. Some of them are left in weld metals even after the completion of solidification and act as starting points of the formation of voids or the like to cause ductile fracture. Thus, the use of flux-cored wires in the related art in MAG welding of duplex stainless steels is less likely to achieve good low-temperature toughness.

In the case of tungsten inert-gas arc welding (TIG welding) of duplex stainless steels with pure Ar gas, clean weld metals containing only small amounts of nonmetallic inclusions are easily produced to provide weld zones with good low-temperature toughness, so that TIG welding is a main welding process in the offshore structure market. However, TIG welding is inferior to MAG welding in terms of working efficiency. Thus, there is a great need for a flux-cored wire configured to provide a weld zone with good low-temperature toughness when a duplex stainless steel is welded by MAG welding with the flux-cored wire.

Various techniques for improving the low-temperature toughness of a weld zone with a flux-cored wire for welding of a duplex stainless steel are disclosed.

For example, Japanese Unexamined Patent Application Publication Nos. 2000-176681 and 2011-125875 disclose flux-cored wires which are configured to provide weld zones with improved low-temperature toughness and in which $Bi_2O_3$ in fluxes is regulated and strong deoxidizing elements, such as Ti, Mg, Al, and rare-earth elements, are added to the wires to reduce the amounts of oxygen in weld metals.

Japanese Patent No. 4531118 discloses a flux-cored wire which is configured to provide a weld zone with improved low-temperature toughness and in which Ti and Mg are added to the wire in combination and the relationship between Ti and N is controlled to reduce the size of crystal grains of a solidified weld metal.

SUMMARY OF THE INVENTION

Each of the flux-cored wires disclosed in Japanese Unexamined Patent Application Publication Nos. 2000-176681 and 2011-125875 has the effect of improving the toughness to some extent. However, in Japanese Unexamined Patent Application Publication Nos. 2000-176681, a weld zone with an impact absorption energy of 27 J or more at −46° C. is rated as "good toughness". In Japanese Unexamined Patent Application Publication No. 2011-125875, a weld zone with an impact absorption energy of 35 J or more at −40° C. is rated as "good toughness". Thus, the flux-cored wires disclosed in Japanese Unexamined Patent Application Publication Nos. 2000-176681 and 2011-125875 cannot sufficiently meet the demand by the current offshore structure market.

The flux-cored wire disclosed in Japanese Patent No. 4531118 is used in welding what is called a popular-priced duplex stainless steel and has a high Mn content. The flux-cored wire disclosed in Japanese Patent No. 4531118 has the effect of improving the impact absorption energy at 0° C. to some extent without consideration of good impact absorption energy at about −40° C. and good pitting corrosion resistance that are essential demands by the offshore structure market.

Each of the flux-cored wires disclosed in Japanese Unexamined Patent Application Publication Nos. 2000-176681 and 2011-125875 and Japanese Patent No. 4531118 is not intended to improve the impact absorption energy from the viewpoint of controlling nonmetallic inclusions serving as main starting points of fracture in the weld zone at about −40° C.

Accordingly, the present invention has been conceived to solve these problems and aims to provide a flux-cored wire which is used for arc welding of a duplex stainless steel to provide a weld zone with good low-temperature toughness and good pitting corrosion resistance, and a weld metal.

As described above, it is generally known that in MAG welding of duplex stainless steels with flux-cored wires, large amounts of nonmetallic inclusions are inevitably introduced into weld metals and act as starting points of fracture in a temperature range where ductile fracture occurs. The inventors have conducted intensive studies on a method for improving toughness by minimizing the action of nonmetallic inclusions in a weld metal as starting points of ductile fracture.

The inventors have thus found that most of nonmetallic inclusions which serve as starting points of ductile fracture and which are observed at the bottoms of voids on a ductile fracture surface are 1.5 m or more in diameter and that the composition of nonmetallic inclusions left in a weld metal can be modified by appropriately controlling a Ti content, an Al content, and the relationship therebetween with respect to the total mass of a wire. Furthermore, the inventors have found that a reduction in the number density of the coarse inclusions with a diameter of 1.5 μm or more results in both good toughness and good pitting corrosion resistance of the weld metal.

The inventors have also found that the flowability and the melting point of a slag are optimized by containing a metal oxide, a metal fluoride, and an alkali metal compound serving as slag-forming components in appropriate ranges, thereby suppressing porosity defects, such as gas grooves and blowholes.

From the studies to solve the foregoing problems, a flux-cored wire according to aspects of the present invention for arc welding of a duplex stainless steel includes elements described below. That is, according to aspects of the present invention, a flux-cored wire for arc welding of a duplex stainless steel includes a stainless-steel sheath filled with a flux and contains, with respect to the total mass of the wire, 21.0% to 27.0% by mass Cr; 7.0% to 11.0% by mass Ni; 2.0% to 4.0% by mass Mo; 0.08% to 0.25% by mass N; 0.1% to 2.5% by mass Mn; 0.1% to 1.0% by mass Si; 0.3% to 0.8% by mass of a Ti alloy in terms of Ti, a Ti alloy content in terms of Ti being expressed as [Ti]; 0.05% to 0.35% by mass of an Al alloy in terms of Al, an Al alloy content in terms of Al being expressed as [Al]; and the balance being Fe, a slag-forming component, and incidental impurities, in which parameter A expressed as A=[Ti]+2×[Al] satisfies 0.6 to 1.20.

The flux-cored wire preferably contains 8% to 13% by mass of the slag-forming component. Preferably, the [Ti] is 0.3% to 0.7% by mass, and the [Al] is 0.05% to 0.30% by mass, in which the parameter A is 0.7 to 1.20.

In these cases, Cr, Ni, Mo, N, Mn, and Si are contained in appropriate ranges, and the Ti alloy content in terms of Ti, the Al alloy content in terms of Al, and the relationship therebetween with respect to the total mass of the wire are controlled in a range defined by a shaded area illustrated in FIG. 1. Thus, a weld zone of the duplex stainless steel has both good low-temperature toughness and good pitting corrosion resistance even in a temperature range of about −40° C.

Preferably, the flux-cored wire according to aspects of the present invention contains a metal oxide; and a metal fluoride, each of the metal oxide and the metal fluoride serving as the slag-forming component, in which the metal oxide contains 5.0% to 9.0% by mass $TiO_2$; 0.1% to 2.0% by mass $SiO_2$; and 0.5% to 3.0% by mass $ZrO_2$, and in which [F] is 0.01% to 0.5% by mass, where [F] represents a metal fluoride content in terms of fluorine, with respect to the total mass of the wire.

In this case, $TiO_2$, $SiO_2$, and $ZrO_2$ serving as the slag-forming components are contained in appropriate ranges, and the metal fluoride content in terms of fluorine with respect to the total mass of the wire is appropriately controlled. Thus, the use of the flux-cored wire results in good welding usability in all-position welding and good porosity defect resistance, as well as achieving both good low-temperature toughness and good pitting corrosion resistance.

Preferably, the flux-cored wire according to aspects of the present invention contains a Li-containing alkali metal compound serving as the slag-forming component, in which [Li] is 0.01% to 0.15% by mass, where [Li] represents an alkali metal compound content in terms of Li, with respect to the total mass of the wire.

In this case, the Li content in terms of Li with respect to the total mass of the wire is appropriately controlled, thus resulting in good porosity defect resistance of a weld zone of the duplex stainless steel.

According to aspects of the present invention, a weld metal is produced by welding with the foregoing flux-cored wire for arc welding of a duplex stainless steel.

The weld metal according to aspects of the present invention is produced by welding with the foregoing flux-cored wire for arc welding of a duplex stainless steel. Thus, the weld metal has both good low-temperature toughness and good pitting corrosion resistance. Furthermore, good welding usability in all-position welding and good porosity defect resistance are provided.

Regarding the flux-cored wire for arc welding of a duplex stainless steel and the weld metal according to aspects of the present invention, when the flux-cored wire is used for arc welding of the duplex stainless steel, the weld metal has good low-temperature toughness, good pitting corrosion resistance, and good porosity defect resistance.

DESCRIPTION OF THE PREFERRED EMBODIMENTS

Figure 1:
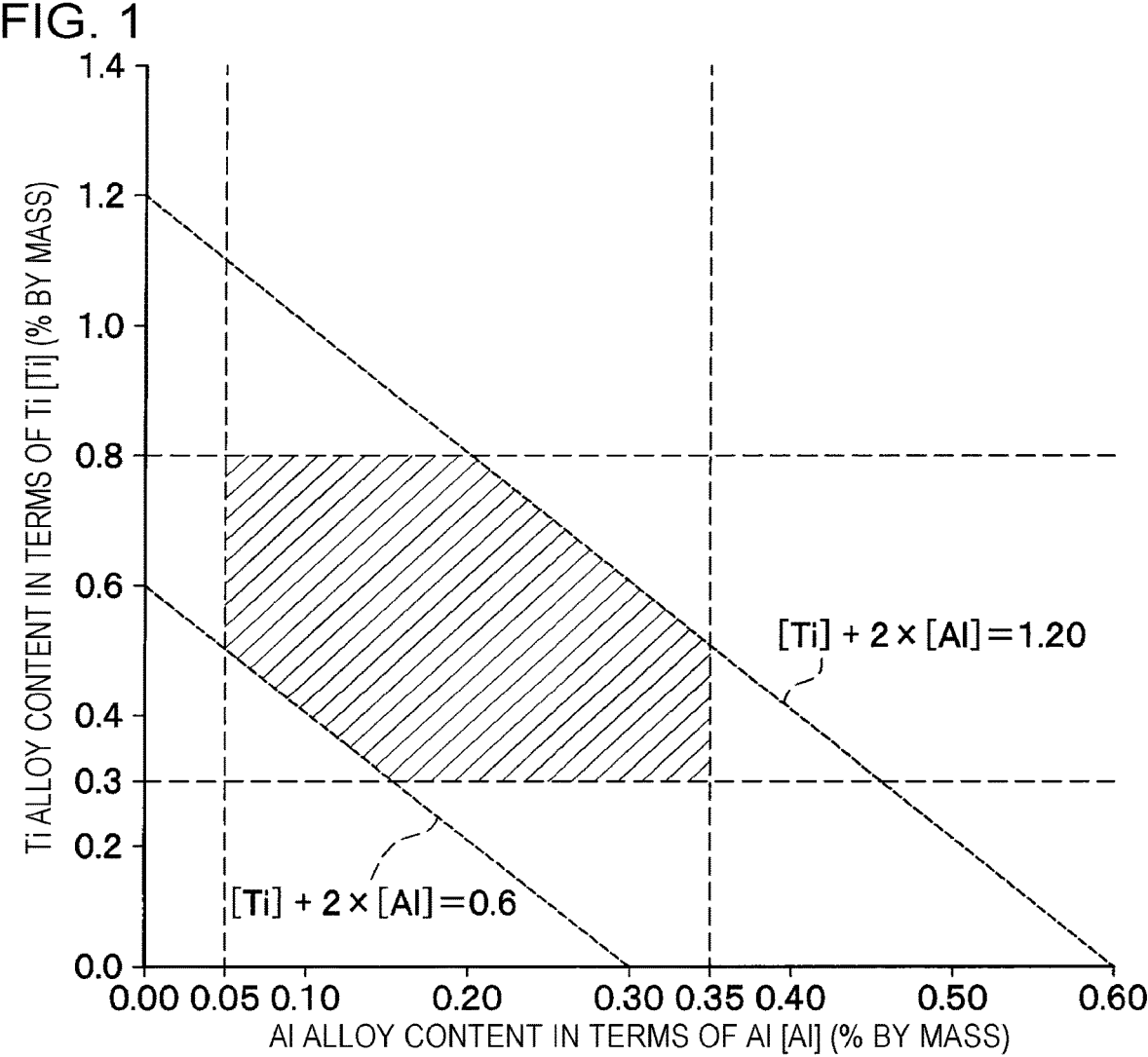
FIG. 1 is a graph illustrating a range of a Ti alloy content in terms of Ti and an Al alloy content in terms of Al where both good low-temperature toughness and good pitting corrosion resistance are achieved, the vertical axis representing the Ti alloy content in terms of Ti, and the horizontal axis representing the Al alloy content in terms of Al.

Embodiments of a flux-cored wire for arc welding of a duplex stainless steel (hereinafter, referred to as a "wire") according to an embodiment of the present invention will be described in detail below.

The wire according to an embodiment of the present invention is a flux-cored wire that includes a sheath containing a flux. The sheath is composed of stainless steel and preferably an austenitic stainless steel. The wire preferably has a flux filling ratio, which is a ratio of the mass of the flux to the total mass of the wire, of 20% to 40% by mass.

In the wire according to an embodiment of the present invention, various cross-sectional shapes of the wire and various diameters of the wire may be used. A welding procedure may be performed according to "Stainless steel flux cored wires and rods for arc welding" of JIS Z3323: 2007. In this case, a shielding gas with a known component system and a known composition may be used.

The wire according to an embodiment of the present invention includes a stainless-steel sheath filled with a flux. The wire contains predetermined amounts of Cr, Ni, Mo, N, Mn, and Si with respect to the total mass of the wire. In the case where a Ti alloy content in terms of Ti is expressed as [Ti] and where an Al alloy content in terms of Al is expressed as [Al], [Ti] and [Al] are predetermined values. Parameter A expressed as A=[Ti]+2×[Al] satisfies a predetermined value. The balance is composed of Fe, a slag-forming component, and incidental impurities. In the balance, in addition to Fe and the slag-forming component, a small amount of K, Na, Mg, or the like serving as an agent for finely controlling arc characteristics may be contained in the flux. This does not affect the object of the present invention. The reason for the numerical limitations of the components of the wire will be described below.

Cr: 21.0% to 27.0% by Mass with Respect to Total Mass of Wire

Cr serves as a ferrite-stabilizing element to adjust a balance between a ferrite phase and an austenite phase and functions as an element that forms a passivation layer to improve the pitting corrosion resistance of a weld zone. At a Cr content less than 21.0% by mass, the function is not sufficiently provided. At a Cr content more than 27.0% by mass, the σ phase, which is an intermetallic compound, precipitates to reduce the low-temperature toughness of a weld zone. Accordingly, the Cr content is limited in the range of 21.0% to 27.0% by mass. The lower limit of the Cr content is preferably 21.5% by mass. The upper limit thereof is preferably 24.0% by mass.

Ni: 7.0% to 11.0% by Mass with Respect to Total Mass of Wire

Ni serves as an austenite-stabilizing element to adjust a balance between a ferrite phase and an austenite phase and is an element effective in improving the low-temperature toughness of a weld zone. At a Ni content less than 7.0% by mass, the effect is not sufficiently provided. A Ni content more than 11.0% by mass results in an excessive amount of the austenite phase in a weld metal, thereby reducing the strength of the weld zone. Accordingly, the Ni content is limited in the range of 7.0% to 11.0% by mass. The lower limit of the Ni content is preferably 8.0% by mass. The upper limit thereof is preferably 10.0% by mass.

Mo: 2.0% to 4.0% by Mass with Respect to Total Mass of Wire

Mo serves as a ferrite-stabilizing element to adjust a balance between a ferrite phase and an austenite phase and has the effect of improving the pitting corrosion resistance of a weld zone together with Cr. At a Mo content less than 2.0% by mass, the function is not sufficiently provided. At a Mo content more than 4.0% by mass, the precipitation of the a phase is promoted to reduce the low-temperature toughness of a weld zone. Accordingly, the Mo content is limited in the range of 2.0% to 4.0% by mass. The lower limit of the Mo content is preferably 2.5% by mass. The upper limit thereof is preferably 3.5% by mass.

N: 0.08% to 0.25% by Mass with Respect to Total Mass of Wire

N serves as an austenite-stabilizing element to adjust a balance between a ferrite phase and an austenite phase and has the effect of improving the pitting corrosion resistance of a weld zone together with Cr and Mo. At a N content less than 0.08% by mass, the effect is not sufficiently provided. A N content more than 0.25% by mass results in a reduction in porosity defect resistance, causing difficulty in producing a good weld joint. Accordingly, the N content is limited in the range of 0.08% to 0.25% by mass. The lower limit of the N content is preferably 0.10% by mass. The upper limit thereof is preferably 0.20% by mass.

Mn: 0.1% to 2.5% by Mass with Respect to Total Mass of Wire

Mn serves as an austenite-stabilizing element to adjust a balance between a ferrite phase and an austenite phase and acts as a deoxidizing element. In an embodiment of the present invention, the deoxidizing effect of Ti and Al, described below, is higher than that of Mn. Thus, the active addition of Mn serving as a deoxidizing element is not necessarily required. The Mn content is 0.1% by mass or more in view of a phase balance in a weld zone. A Mn content more than 2.5% by mass results in the formation of MnS to reduce the low-temperature toughness of the weld zone. Accordingly, the Mn content is limited in the range of 0.1% to 2.5% by mass. The lower limit of Mn is preferably 0.5% by mass. The upper limit thereof is preferably 2.0% by mass.

Si: 0.1% to 1.0% by Mass with Respect to Total Mass of Wire

Si serves as a ferrite-stabilizing element to adjust a balance between a ferrite phase and an austenite phase and acts as a deoxidizing element. In an embodiment of the present invention, the deoxidizing effect of Ti and Al, described below, is higher than that of Si. Thus, the active addition of Si serving as a deoxidizing element is not necessarily required. The Si content is 0.1% by mass or more in view of a phase balance in a weld zone. A Si content more than 1.0% by mass results in a reduction in the low-temperature toughness of the weld zone due to an increase in the amount of Si dissolved.

Accordingly, the Si content is limited in the range of 0.1% to 1.0% by mass. The lower limit of the Si content is preferably 0.2% by mass. The upper limit thereof is preferably 0.7% by mass.

[Ti] (Ti alloy content in terms of Ti with respect to total mass of wire): 0.3% to 0.8% by mass

[Al] (Al alloy content in terms of Al with respect to total mass of wire): 0.05% to 0.35% by mass A: 0.6 to 1.20

Ti and Al are strong deoxidizing elements and the most important elements in an embodiment of the present invention. Specifically, the addition of appropriate amounts of Ti and Al modifies compositions of nonmetallic inclusions left in a weld metal in a molten state from compositions of the inclusions composed of Si—Mn-based oxides to compositions of the inclusions mainly containing Ti—Al-based oxides. In the weld metal, the aggregation and growth of the inclusions are inhibited by the change into the oxide composition, in particular, by a reduction in the amounts of Si-based inclusions, thereby reducing the number density of coarse inclusions with a diameter of 1.5 m or more, the coarse inclusion acting as starting points of ductile fracture. This improves the low-temperature toughness of a weld zone at about −40° C.

To sufficiently provide the effect, the inventors have conducted a large number of experimental studies on the relationship between the Ti and Al contents in the wire and the low-temperature toughness and pitting corrosion resistance of a weld zone and have found that controlling Ti or Al does not sufficiently provide the effect and that the optimization of both of the Ti content and the Al content is indispensable.

Specifically, in the case where the Ti alloy content in terms of Ti is expressed as [Ti], the Al alloy content in terms of Al is expressed as [Al], and parameter A is expressed as A=[Ti]+2×[Al], when [Ti] is less than 0.3% by mass, [Al] is less than 0.05% by mass, or the parameter A is less than 0.6, the effect of modifying the compositions of the nonmetallic inclusions is not sufficiently provided. Thus, the effect of reducing the number density of the coarse inclusions with a diameter of 1.5 μm or more is not sufficiently provided, thereby failing to provide the desired effect of improving the low-temperature toughness of a weld zone.

When [Ti] is more than 0.8% by mass, the amount of Ti equal to or more than that required for the compositional modification of the nonmetallic inclusions is introduced into the weld metal in a molten state. An excessive amount of Ti that does not contribute to the compositional modification of the inclusions reacts partially with a large amount N present in the weld metal into TiN. Thus, when [Ti] is more than 0.8% by mass, the aggregation and coarsening of the inclusions are caused to increase the risk of forming starting points of pitting corrosion. Furthermore, the amount of N in a parent phase is reduced to reduce the pitting corrosion resistance of the weld zone.

When [Al] is more than 0.35% by mass, the main composition of the inclusions is $Al_2O_3$. This leads to coarsening of the inclusions, thus reducing the pitting corrosion resistance of the weld zone. The deoxidation ability of Al is stronger than that of Ti. Thus, the addition of an excessive amount of Al leads to an increase in an excessive amount of Ti that does not contribute to the compositional modification of the nonmetallic inclusions. Accordingly, when [Al] is more than 0.35% by mass, Al is an indirect factor in forming TiN. Thus, the pitting corrosion resistance of the weld zone can be reduced as described above.

An excessive amount of Ti varies depending on the amount of Al added, as described above. Thus, even in the case where both of [Ti] and [Al] with respect to the total mass of the wire satisfy the ranges, when parameter A is more than 1.20, an excessive amount of Ti is increased to reduce the pitting corrosion resistance of the weld zone.

From the reason described above, in an embodiment of the present invention, [Ti] is limited in the range of 0.3% to 0.8% by mass, [Al] is limited in the range of 0.05% to 0.35% by mass, parameter A ([Ti]+2×[Al]) is limited in the range of 0.6 to 1.20, and [Ti] and [Al] are limited to the range illustrated in FIG. 1. Preferably, [Ti] is in the range of 0.3% to 0.7% by mass, [Al] is in the range of 0.05% to 0.30% by mass, and parameter A is in the range of 0.7 to 1.20.

Ti and Al each may be added in any form, for example, metal Ti, metal Al, Fe—Ti, or Fe—Al. When the form of each of Ti and Al is selected from them, the same effect is provided as long as [Ti], [Al], and parameter A are in the foregoing ranges.

Balance

The balance is Fe, a slag-forming component, and incidental impurities.

Examples of the slag-forming component include metal oxides, metal fluorides, and alkali metal compounds. The slag-forming component is usually contained in typical flux-cored wires, except metal-based wires, for MAG welding and is absolutely required to hold a weld metal, in particular, when all-position welding is performed. When the slag-forming component content is less than 8% by mass in total, a slag does not uniformly cover the weld metal because of an excessively small amount of the slag. Thus, the appearance of a bead is impaired, and a force to hold the weld metal is reduced to cause welding usability to be liable to deteriorate in all-position welding. When the slag-forming component content is more than 13% by mass in total, the covering property of the slag and the force to hold the weld metal are not improved. Furthermore, an excessively large amount of the slag is formed to cause a gas generated in the solidification of the weld metal to be easily trapped at a slag-weld metal interface, thereby easily causing porosity defects such as pits. The slag-forming component content is preferably in the range of 8% to 13% by mass in total. More preferably, the lower limit of the slag-forming component content is 9% by mass, and the upper limit thereof is 12% by mass.

Examples of the incidental impurities include C, P, S, Cu, Nb, V, and W. The incidental impurities may be contained as long as the advantageous effect of an embodiment of the present invention is not impaired. In addition, a small amount of K, Na, Mg, or the like serving as an agent for finely controlling arc characteristics may be contained in the flux. This does not affect the object of the present invention.

A wire according to a preferred embodiment of the present invention will be described below.

Preferably, the wire contains a metal oxide and a metal fluoride that serve as the slag-forming component, the metal oxide contains predetermined amounts of $TiO_2$, $SiO_2$, and $ZrO_2$ with respect to the total mass of the wire, and letting a metal fluoride content in terms of fluorine be [F], [F] is a predetermined value. The reason for the numerical limitations of the components of the wire will be described below.

$TiO_2$: 5.0% to 9.0% by Mass with Respect to Total Mass of Wire $TiO_2$ is a main component of a slag-forming agent in a flux-cored wire for all-position welding. $TiO_2$ has the effect of improving the covering of a weld metal with a slag to provide a good bead shape and has the effect of increasing the solidification rate of the slag to improve welding usability during vertical or overhead welding. A predetermined $TiO_2$ content results in the effect of stabilizing an arc. At $TiO_2$ content less than 5.0% by mass, these effects are not sufficiently provided, thus degrading the welding usability. At a $TiO_2$ content more than 9.0% by mass, the slag is hardened during welding to degrade slag separation and porosity defect resistance. Accordingly, the $TiO_2$ content is limited in the range of 5.0% to 9.0% by mass.

$SiO_2$: 0.1% to 2.0% by Mass with Respect to Total Mass of Wire $SiO_2$ has the effect of improving the covering of a weld metal with a slag to provide a good bead shape and has the effect of improving bead wetting. At a $SiO_2$ content less than 0.1% by mass, these effects are not sufficiently provided, thus degrading welding usability. A $SiO_2$ content more than 2.0% by mass results in the hardening of the slag to significantly degrade slag separation. Accordingly, the $SiO_2$ content is limited in the range of 0.1% to 2.0% by mass.

$ZrO_2$: 0.5% to 3.0% by Mass with Respect to Total Mass of Wire $ZrO_2$ has the effect of increasing the solidification of a slag to improve welding usability during vertical or overhead welding. At a $ZrO_2$ content less than 0.5% by mass, the effect is not sufficiently provided, thus degrading the welding usability. A $ZrO_2$ content more than 3.0% by mass results in the degradation of slag separation. Accordingly, the $ZrO_2$ content is limited in the range of 0.5% to 3.0% by mass.

[F]: 0.01% to 0.5% by Mass with Respect to Total Mass of Wire

The metal fluoride has the effect of controlling the flowability of a slag and improves slag separation. The metal fluoride also has the effect of suppressing porosity defects, such as pits and blowholes. In the case where a metal fluoride content in terms of fluorine is expressed as [F], when [F] is less than 0.01% by mass, these effects are not sufficiently provided, thus degrading welding usability. When [F] is more than 0.5% by mass, no further improvements in slag separation or porosity defect resistance are achieved. Furthermore, the flowability of the slag is excessively high, thus causing difficulty in performing vertical or overhead welding. When [F] is more than 0.5% by mass, excessively large amounts of fumes are generated, and the stability of an arc is degraded. Accordingly, [F] is limited in the range of 0.01% to 0.5% by mass.

In a wire according to a preferred embodiment of the present invention, the wire preferably includes a Li-containing alkali metal compound serving as the slag-forming component, and letting an alkali metal compound content in terms of Li be [Li], [Li] is preferably a predetermined amount with respect to the total mass of the wire. The reason for the numerical limitation of the component of the wire will be described below.

[Li]: 0.01% to 0.15% by Mass with Respect to Total Mass of Wire

The Li-containing alkali metal compound has the effect of stabilizing an arc, similarly to a compound of an alkali metal, for example, Na or K. Furthermore, Li is an element that is very effective in suppressing porosity defects in duplex stainless steels. Duplex stainless steels contain a large amount of N in a base metal and a weld metal and thus are materials in which porosity defects, such as pits and blowholes, are very easily formed by $N_2$ gas. Upon adding Li to a weld zone, Li is bound to a minute amount of Ti and N that is contained in an amount more than its solid solubility limit in a weld metal and then is removed as a slag from the weld metal. Thus, Li has the effect of inhibiting the formation of blowholes. Li also has the effect of preventing or inhibiting the formation of a pit or blowhole by reducing the melting point and the viscosity of the slag to promote release of a gas generated in the weld zone into the atmosphere.

In the case where a Li-containing alkali metal compound content in terms of Li is expressed as [Li], when [Li] is less than 0.01% by mass, these effects are not sufficiently provided, thus degrading the porosity defect resistance. When [Li] is more than 0.15% by mass, no further improvement in porosity defect resistance is achieved. Furthermore, the melting point of a slag is excessively reduced to cause difficulty in performing vertical or overhead welding. Moreover, excessively large amounts of fumes are generated, and the hygroscopic properties of the wire are degraded. Accordingly, [Li] is limited in the range of 0.01% to 0.15% by mass. The Li-containing alkali metal compound may be used in any form, for example, a Li oxide, a Li fluoride, or a Li carbonate. When the form of the Li-containing alkali metal compound is selected from them, the same effect is provided as long as [Li] is in the foregoing range.

The wire according to a preferred embodiment may contain, as the slag-forming component, various metal oxides, metal fluorides, and alkali metal compounds other than the foregoing components. For example, the wire may contain $Al_2O_a$, $MgO$, $MnO_2$, $Na_2O$, $K_2O$, and so forth in addition to $TiO_2$, $ZrO_2$, $SiO_2$, the metal fluoride, and the Li-containing alkali metal compound. The amount of the slag-forming component, such as $Al_2O_3$, is preferably less than 3% by mass in total.

A weld metal according to an embodiment of the present invention will be described below.

The weld metal according to an embodiment of the present invention is produced by welding with the flux-cored wire for arc welding of a duplex stainless steel. Since the weld metal is produced by welding with the flux-cored wire for arc welding of a duplex stainless steel, the weld metal has good low-temperature toughness, good pitting corrosion resistance, and good porosity defect resistance. The composition and other features of the flux-cored wire for arc welding of a duplex stainless steel are the same as those described above, and redundant descriptions are not repeated.

EXAMPLES

Advantageous effects of embodiments of the present invention will be specifically described below by examples and comparative examples of embodiments of the present invention.

Flux-cored wires having compositions, with respect to the total mass of each wire, listed in Table 4 of examples and comparative examples were each produced by charging a flux into a sheath composed of an austenitic stainless steel having a composition listed in Table 1 while the sheath was formed into a cylinder. The flux filling ratio was 27% by mass.

Figure 2:
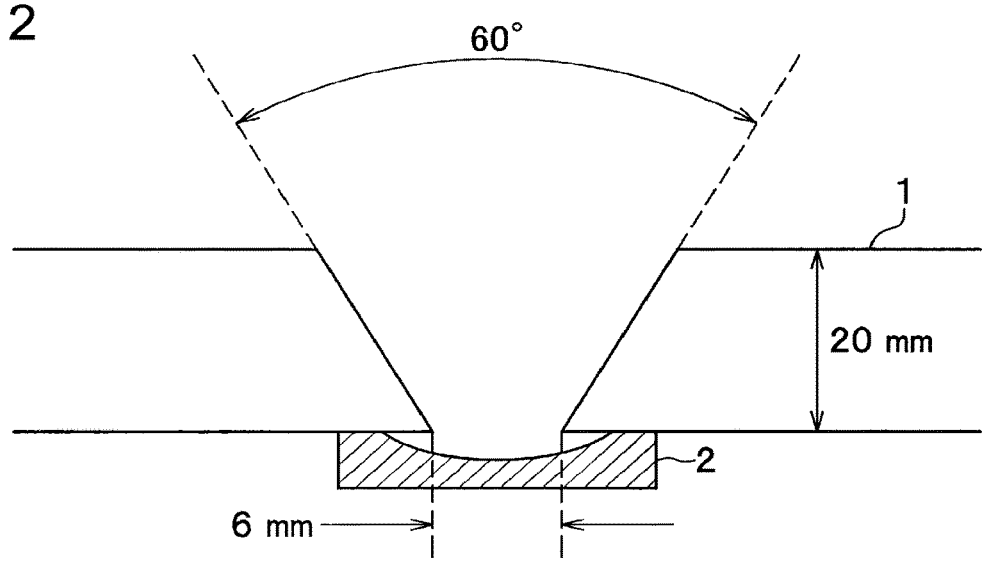
FIG. 2 is a schematic diagram of a groove shape of a weld joint to be produced by flat or vertical-up welding.

As illustrated in FIG. 2, bevels were formed on groove faces of members of a 20-mm-thick base metal 1 composed of a duplex stainless steel in such a manner that a groove angle was 60°. The members of the base metal 1 were arranged in such a manner that a root gap was 6 mm. A ceramic backing member 2 was arranged on the narrow side of the groove. The base metal had a composition listed in Table 2.

The members of the base metal 1 were welded by flat or vertical-up welding with the flux-cored wires under welding conditions listed in Table 3 to produce weld joints each having a length of 300 mm. The low-temperature toughness and the pitting corrosion resistance of the weld joints produced by the flat welding were evaluated. Regarding porosity defect resistance, defects are more easily formed in the vertical-up welding than in the flat welding. Thus, the porosity defect resistance of the weld joints produced by the vertical-up welding was evaluated by a method described below.

Low-Temperature Toughness

Three Charpy V-notch impact test specimens (10 mm×10 mm, 2-mm-deep notch) according to AWS A5.22 were sampled from a middle portion of each weld joints, produced by the flat welding, in the thickness direction and a middle portion of a weld metal in the width direction. The specimens were subjected to an impact test at −40° C.

The average impact absorption energy was calculated. The specimens were evaluated according to evaluation criteria described below.

"Poor": The average impact absorption energy (vE−40° C.) is less than 70 J.

"Fair": The average impact absorption energy (vE−40° C.) is 70 J or more and less than 80 J.

"Good": The average impact absorption energy (vE−40° C.) is 80 J or more.

Table 5 lists the results.

Pitting Corrosion Resistance

Specimens according to ASTM G48 Method A were sampled from the weld metal portions of the weld joints produced by the flat welding. The specimens were subjected to a pitting corrosion test at 22° C. for 72 hours, and corrosion rates were calculated. The specimens were evaluated according to evaluation criteria described below.

"Poor": The corrosion rate is 10 mdd or more.

"Fair": The corrosion rate is less than 10 mdd and 5 mdd or more.

"Good": The corrosion rate is less than 5 mdd.

Table 5 lists the results.

Porosity Defect Resistance

The excess weld metal of each of the weld joints produced by the vertical-up welding was removed by grinding to form a flat surface in such a manner that the flat surface was flush with the corresponding surface of the base metal. The porosity defect resistance of a weld zone was evaluated by X-ray radiography inspection. The joints were evaluated according to evaluation criteria described below.

"Poor": A blowhole with a diameter more than 1.5 mm is present in the weld zone.

"Fair": A blowhole with a diameter of 0.8 mm or more and 1.5 mm or less is present in the weld zone.

"Good": No blowhole is present, or a blowhole with a diameter less than 0.8 mm is present.

Table 5 lists the results. All the weld joints produced by the vertical-up welding were evaluated as "Good" or "Fair", and none of the weld joints were evaluated as "Poor".

Comprehensive Evaluation

As a comprehensive evaluation, the joints were evaluated according to comprehensive evaluation criteria described below.

"Poor": At least one of the three evaluation items is evaluated as "poor".

"Good": One of the three evaluation items is evaluated as "Fair", and the other evaluation items are evaluated as "Good".

"Excellent": All the three evaluation items are evaluated as "Good".

Table 5 lists the results.

TABLE 1

Composition of sheath (% by mass)

| C | Si | Mn | P | S | Cu | Ni | Cr | Mo | N | Fe and incidental impurities |
|---|---|---|---|---|---|---|---|---|---|---|
| 0.01 | 0.27 | 1.09 | 0.021 | 0.003 | 0.11 | 8.2 | 18.4 | 0.07 | 0.01 | balance |

TABLE 2

Composition of base metal (% by mass)

| C | Si | Mn | P | S | Cu | Ni | Cr | Mo | N | Fe and incidental impurities |
|---|---|---|---|---|---|---|---|---|---|---|
| 0.02 | 0.29 | 1.00 | 0.023 | <0.001 | 0.10 | 5.5 | 22.8 | 3.1 | 0.17 | balance |

TABLE 3

Welding conditions

| Welding position | flat | vertical up |
|---|---|---|
| Polarity | DCEP | DCEP |
| Welding current [A] | 190-210 | 150-170 |
| Arc voltage [V] | 28-30 | 25-27 |
| Welding speed [cm/min] | 25-30 | 5-10 |
| Shielding gas | 80%Ar + 20%CO$_2$ | 80%Ar + 20%CO$_2$ |
| Distance between wire tip and base metal [mm] | 20 | 15 |

TABLE 5

| | No. | Low-temperature toughness vE-40° C. (J) | Pitting corrosion resistance Corrosion rate (mdd) | Porosity defect resistance | Comprehensive evaluation |
|---|---|---|---|---|---|
| Example | 1 | 94 Good | 0.0 Good | Good | Excellent |
| | 2 | 86 Good | 0.0 Good | Good | Excellent |
| | 3 | 108 Good | 0.0 Good | Good | Excellent |
| | 4 | 90 Good | 0.0 Good | Good | Excellent |
| | 5 | 101 Good | 0.0 Good | Good | Excellent |

TABLE 4

Compositional ratio with respect to total mass of wire (balance: Fe and incidental impurities) (% by mass, except for parameter A)

| | No. | Cr | Ni | Mo | N | Si | Mn | Ti alloy content in terms of Ti [Ti] | Al alloy content in terms of Al [Al] | Parameter A | Metal oxide TiO$_2$ | SiO$_2$ | ZrO$_2$ | Metal oxide content in terms of fluorine [F] | Alkali metal compound content in terms of Li [Li] |
|---|---|---|---|---|---|---|---|---|---|---|---|---|---|---|---|
| Example | 1 | 22.1 | 8.0 | 2.7 | 0.13 | 0.4 | 1.2 | 0.68 | 0.13 | 0.95 | 6.8 | 0.5 | 1.8 | 0.34 | 0.09 |
| | 2 | 22.4 | 8.2 | 2.9 | 0.15 | 0.3 | 1.1 | 0.34 | 0.20 | 0.74 | 6.5 | 1.4 | 0.6 | 0.18 | 0.04 |
| | 3 | 22.4 | 8.6 | 2.9 | 0.12 | 0.3 | 1.0 | 0.34 | 0.27 | 0.87 | 5.6 | 1.6 | 1.1 | 0.35 | 0.04 |
| | 4 | 22.0 | 9.1 | 3.0 | 0.14 | 0.2 | 0.8 | 0.51 | 0.13 | 0.78 | 6.1 | 1.0 | 1.7 | 0.06 | 0.04 |
| | 5 | 21.6 | 9.5 | 2.8 | 0.10 | 0.5 | 1.4 | 0.51 | 0.20 | 0.91 | 8.4 | 0.6 | 1.6 | 0.17 | 0.04 |
| | 6 | 22.1 | 9.3 | 3.0 | 0.11 | 0.6 | 1.5 | 0.51 | 0.27 | 1.04 | 7.2 | 0.9 | 2.2 | 0.18 | 0.04 |
| | 7 | 22.2 | 8.1 | 2.7 | 0.13 | 0.5 | 0.9 | 0.68 | 0.13 | 0.95 | 6.9 | 0.4 | 2.1 | 0.41 | 0.04 |
| | 8 | 23.5 | 9.4 | 3.4 | 0.18 | 0.6 | 1.1 | 0.68 | 0.20 | 1.08 | 6.3 | 0.6 | 2.0 | 0.31 | 0.04 |
| | 9 | 23.1 | 9.1 | 3.3 | 0.20 | 0.4 | 1.5 | 0.68 | 0.07 | 0.81 | 8.3 | 0.9 | 2.5 | 0.25 | 0.04 |
| | 10 | 22.4 | 8.3 | 2.8 | 0.12 | 0.5 | 1.0 | 0.34 | 0.13 | 0.61 | 6.9 | 0.4 | 2.1 | 0.41 | 0.04 |
| | 11 | 21.8 | 8.6 | 3.0 | 0.11 | 0.5 | 1.2 | 0.51 | 0.07 | 0.64 | 6.5 | 1.4 | 0.5 | 0.10 | 0.04 |
| | 12 | 22.4 | 8.8 | 2.7 | 0.11 | 0.5 | 0.8 | 0.34 | 0.33 | 1.00 | 8.4 | 0.5 | 1.6 | 0.17 | 0.01 |
| | 13 | 23.4 | 9.6 | 3.3 | 0.15 | 0.4 | 0.9 | 0.77 | 0.13 | 1.03 | 6.8 | 0.5 | 1.8 | 0.34 | 0.01 |
| | 14 | 22.3 | 8.2 | 3.0 | 0.15 | 0.5 | 1.0 | 0.68 | 0.20 | 1.08 | 6.9 | 0.4 | 2.1 | 0.41 | 0.00 |
| | 15 | 21.4 | 8.3 | 2.9 | 0.14 | 0.4 | 1.1 | 0.68 | 0.07 | 0.82 | 6.8 | 0.5 | 1.8 | 0.34 | 0.00 |
| | 16 | 26.2 | 9.9 | 2.5 | 0.18 | 0.4 | 1.5 | 0.34 | 0.20 | 0.74 | 6.5 | 1.4 | 0.6 | 0.18 | 0.00 |
| Comparative example | 17 | 22.1 | 7.9 | 2.9 | 0.13 | 0.6 | 0.9 | 0.34 | 0.00 | 0.34 | 6.6 | 1.0 | 2.4 | 0.39 | 0.00 |
| | 18 | 23.3 | 8.4 | 3.1 | 0.17 | 0.4 | 1.2 | 0.34 | 0.07 | 0.48 | 6.5 | 0.8 | 1.7 | 0.11 | 0.01 |
| | 19 | 21.8 | 8.5 | 2.9 | 0.14 | 0.4 | 1.3 | 0.68 | 0.00 | 0.68 | 6.9 | 1.2 | 2.0 | 0.45 | 0.04 |
| | 20 | 21.2 | 8.0 | 2.7 | 0.11 | 0.3 | 1.0 | 0.10 | 0.27 | 0.63 | 6.1 | 1.0 | 1.7 | 0.14 | 0.01 |
| | 21 | 21.8 | 8.7 | 3.4 | 0.13 | 0.5 | 1.1 | 0.85 | 0.07 | 0.98 | 4.3 | 0.3 | 1.8 | 0.50 | 0.04 |
| | 22 | 21.9 | 8.2 | 3.0 | 0.12 | 0.5 | 1.0 | 0.34 | 0.40 | 1.14 | 7.7 | 1.0 | 2.1 | 0.14 | 0.01 |
| | 23 | 23.4 | 9.4 | 3.3 | 0.13 | 0.5 | 0.9 | 0.68 | 0.27 | 1.21 | 8.3 | 2.2 | 0.9 | 0.25 | 0.01 |
| | 24 | 21.8 | 8.3 | 2.7 | 0.11 | 0.4 | 1.2 | 0.85 | 0.13 | 1.12 | 6.9 | 0.4 | 2.0 | 0.28 | 0.04 |
| | 25 | 22.2 | 8.1 | 2.9 | 0.15 | 0.5 | 1.0 | 0.85 | 0.20 | 1.25 | 6.3 | 0.6 | 2.0 | 0.31 | 0.04 |
| | 26 | 21.4 | 5.1 | 1.0 | 0.14 | 0.4 | 3.7 | 0.51 | 0.20 | 0.91 | 5.6 | 1.6 | 0.7 | 0.10 | 0.01 |

Parameter A = [Ti] + 2 × [Al]
Underlined portions indicate that requirements of claim 1 are not satisfied.

TABLE 5-continued

| No. | | Low-temperature toughness vE-40° C. (J) | | Pitting corrosion resistance Corrosion rate (mdd) | | Porosity defect resistance | Comprehensive evaluation |
|---|---|---|---|---|---|---|---|
| | 6 | 99 | Good | 0.0 | Good | Good | Excellent |
| | 7 | 120 | Good | 0.0 | Good | Good | Excellent |
| | 8 | 113 | Good | 2.0 | Good | Good | Excellent |
| | 9 | 82 | Good | 0.2 | Good | Good | Excellent |
| | 10 | 79 | Fair | 0.0 | Good | Good | Good |
| | 11 | 73 | Fair | 0.5 | Good | Good | Good |
| | 12 | 87 | Good | 5.6 | Fair | Good | Good |
| | 13 | 96 | Good | 7.7 | Fair | Good | Good |
| | 14 | 104 | Good | 0.0 | Good | Fair | Good |
| | 15 | 85 | Good | 0.0 | Good | Fair | Good |
| | 16 | 80 | Good | 0.4 | Good | Fair | Good |
| Comparative example | 17 | 50 | Poor | 0.0 | Good | Fair | Poor |
| | 18 | 56 | Poor | 0.0 | Good | Good | Poor |
| | 19 | 64 | Poor | 0.0 | Good | Good | Poor |
| | 20 | 68 | Poor | 0.0 | Good | Good | Poor |
| | 21 | 70 | Fair | 19.2 | Poor | Good | Poor |
| | 22 | 72 | Fair | 164.0 | Poor | Good | Poor |
| | 23 | 116 | Good | 14.4 | Poor | Good | Poor |
| | 24 | 86 | Good | 29.1 | Poor | Good | Poor |
| | 25 | 89 | Good | 15.1 | Poor | Good | Poor |
| | 26 | 67 | Poor | 13.2 | Poor | Good | Poor |

As listed in Tables 4 and 5, the weld zones of the flux-cored wires of Examples 1 to 16 exhibited good performance because the compositions of the flux-cored wires of Examples 1 to 16 satisfy the scope of the present invention. In particular, the weld zones of the flux-cored wires of Examples 1 to 9 exhibited better performance than those of Examples 10 to 16 because the compositions of the flux-cored wires of Examples 1 to 9 satisfy the preferred scope of the present invention.

The weld zones of the flux-cored wires of Comparative examples 17 to 26 exhibited performance inferior to those of Examples 1 to 16 because the compositions of the flux-cored wires of Comparative examples 17 to 26 did not satisfy the scope of the present invention in terms of the following points.

Specifically, in Comparative example 17, [Al] was less than the lower limit, and parameter A was also less than the lower limit; hence, the wire had poor low-temperature toughness. In Comparative example 18, parameter A was less than the lower limit; hence, the wire had poor low-temperature toughness. In Comparative example 19, [Al] was less than the lower limit; hence, the wire had poor low-temperature toughness. In Comparative example 20, [Ti] was less than the lower limit; hence, the wire had poor low-temperature toughness.

In Comparative example 21, [Ti] was more than the upper limit; hence, the wire had poor pitting corrosion resistance. In Comparative example 21, the $TiO_2$ content was also less than the lower limit; hence, the wire also exhibited low all-position weldability. In Comparative example 22, [Al] was more than the upper limit; hence, the wire had poor pitting corrosion resistance. In Comparative example 23, parameter A was more than the upper limit; hence, the wire had poor pitting corrosion resistance. In Comparative example 23, the $SiO_2$ content was also more than the upper limit; hence, poor slag separation was also observed.

In Comparative example 24, [Ti] was more than the upper limit; hence, the wire had poor pitting corrosion resistance. In Comparative example 25, both [Ti] and parameter A were more than the respective upper limits; hence, the wire had poor pitting corrosion resistance. In Comparative example 26, the Ni content was less than the lower limit, and the Mn content was more than the upper limit; hence, the wire had poor low-temperature toughness. In Comparative example 26, the Mo content was less than the lower limit; hence, the wire had poor pitting corrosion resistance.

What is claimed is:

1. A flux-cored wire, comprising, with respect to a total mass of the wire:
   21.0% to 27.0% by mass Cr;
   7.0% to 11.0% by mass Ni;
   2.0% to 4.0% by mass Mo;
   0.08% to 0.25% by mass N;
   0.1% to 2.5% by mass Mn;
   0.1% to 1.0% by mass Si;
   0.3% to 0.8% by mass of a Ti alloy in terms of Ti, a Ti alloy content in terms of Ti being expressed as [Ti];
   0.07% to 0.35% by mass of an Al alloy in terms of Al, an Al alloy content in terms of Al being expressed as [Al]; and
   the balance being Fe, a slag-forming component, and incidental impurities,
   wherein parameter A expressed as A=[Ti]+2×[Al] satisfies 0.6 to 1.20.

2. The flux-cored wire according to claim 1, comprising: 8% to 13% by mass of the slag-forming component.

3. The flux-cored wire according to claim 2, wherein the [Ti] is 0.3% to 0.7% by mass, and
   the [Al] is 0.07% to 0.30% by mass,
   wherein the parameter A is 0.7 to 1.20.

4. The flux-cored wire according to claim 3, comprising:
   a metal oxide; and
   a metal fluoride, each of the metal oxide and the metal fluoride serving as the slag-forming component,
   wherein the metal oxide comprises:
   5.0% to 9.0% by mass $TiO_2$;
   0.1% to 2.0% by mass $SiO_2$; and
   0.5% to 3.0% by mass $ZrO_2$, and
   wherein [F] is 0.01% to 0.5% by mass, where [F] represents a metal fluoride content in terms of fluorine, with respect to the total mass of the wire.

5. The flux-cored wire according to claim 4, comprising:
   a Li-containing alkali metal compound serving as the slag-forming component,
   wherein [Li] is 0.01% to 0.15% by mass, where [Li] represents the alkali metal compound content in terms of Li, with respect to the total mass of the wire.

6. The flux-cored wire according to claim 2, comprising:
   a metal oxide; and
   a metal fluoride, each of the metal oxide and the metal fluoride serving as the slag-forming component,
   wherein the metal oxide comprises:
   5.0% to 9.0% by mass $TiO_2$;
   0.1% to 2.0% by mass $SiO_2$; and
   0.5% to 3.0% by mass $ZrO_2$, and
   wherein [F] is 0.01% to 0.5% by mass, where [F] represents a metal fluoride content in terms of fluorine, with respect to the total mass of the wire.

7. The flux-cored wire according to claim 6, comprising:
   a Li-containing alkali metal compound serving as the slag-forming component,
   wherein [Li] is 0.01% to 0.15% by mass, where [Li] represents the alkali metal compound content in terms of Li, with respect to the total mass of the wire.

8. The flux-cored wire according to claim 2, comprising:
   a Li-containing alkali metal compound serving as the slag-forming component, wherein [Li] is 0.01% to 0.15% by mass, where [Li] represents the alkali metal compound content in terms of Li, with respect to the total mass of the wire.

9. The flux-cored wire according to claim 3, comprising:
a Li-containing alkali metal compound serving as the slag-forming component,
wherein [Li] is 0.01% to 0.15% by mass, where [Li] represents the alkali metal compound content in terms of Li, with respect to the total mass of the wire.

10. The flux-cored wire according to claim 1, wherein the [Ti] is 0.3% to 0.7% by mass, and
the [Al] is 0.07% to 0.30% by mass,
wherein the parameter A is 0.7 to 1.20.

11. The flux-cored wire according to claim 10, comprising:
a metal oxide; and
a metal fluoride, each of the metal oxide and the metal fluoride serving as the slag-forming component,
wherein the metal oxide comprises:
5.0% to 9.0% by mass $TiO_2$;
0.1% to 2.0% by mass $SiO_2$; and
0.5% to 3.0% by mass $ZrO_2$, and
wherein [F] is 0.01% to 0.5% by mass, where [F] represents a metal fluoride content in terms of fluorine, with respect to the total mass of the wire.

12. The flux-cored wire according to claim 11, comprising:
a Li-containing alkali metal compound serving as the slag-forming component,
wherein [Li] is 0.01% to 0.15% by mass, where [Li] represents the alkali metal compound content in terms of Li, with respect to the total mass of the wire.

13. The flux-cored wire according to claim 10, comprising:
a Li-containing alkali metal compound serving as the slag-forming component,
wherein [Li] is 0.01% to 0.15% by mass, where [Li] represents the alkali metal compound content in terms of Li, with respect to the total mass of the wire.

14. The flux-cored wire according to claim 1, comprising:
a metal oxide; and
a metal fluoride, each of the metal oxide and the metal fluoride serving as the slag-forming component,
wherein the metal oxide comprises:
5.0% to 9.0% by mass $TiO_2$;
0.1% to 2.0% by mass $SiO_2$; and
0.5% to 3.0% by mass $ZrO_2$, and
wherein [F] is 0.01% to 0.5% by mass, where [F] represents a metal fluoride content in terms of fluorine, with respect to the total mass of the wire.

15. The flux-cored wire according to claim 14, comprising:
a Li-containing alkali metal compound serving as the slag-forming component,
wherein [Li] is 0.01% to 0.15% by mass, where [Li] represents the alkali metal compound content in terms of Li, with respect to the total mass of the wire.

16. The flux-cored wire according to claim 1, comprising:
a Li-containing alkali metal compound serving as the slag-forming component,
wherein [Li] is 0.01% to 0.15% by mass, where [Li] represents the alkali metal compound content in terms of Li, with respect to the total mass of the wire.

17. A weld metal produced by welding with the flux-cored wire according to claim 1.

18. A weld metal produced by welding with the flux-cored wire according to claim 2.

19. A weld metal produced by welding with the flux-cored wire according to claim 10.

* * * * *